United States Patent [19]

Mugford

[11] 3,796,026
[45] Mar. 12, 1974

[54] LIQUID-GAS SEPARATOR

[75] Inventor: Charles C. Mugford, Hermosa Beach, Calif.

[73] Assignee: Farr Company, El Segundo, Calif.

[22] Filed: Apr. 5, 1971

[21] Appl. No.: 131,290

[52] U.S. Cl............... 55/338, 55/348, 55/385, 55/456, 55/466
[51] Int. Cl............................................ B01d 45/12
[58] Field of Search ............ 55/347, 348, 396, 456, 55/457, 450, 338, 385, 466

[56] References Cited
UNITED STATES PATENTS

| | | | |
|---|---|---|---|
| 1,669,413 | 5/1928 | Donaldson | 55/456 |
| 1,896,895 | 2/1933 | Howleg | 55/396 |
| 3,448,563 | 6/1969 | Sobeck | 55/450 |
| 3,611,679 | 10/1971 | Pall | 55/457 |

FOREIGN PATENTS OR APPLICATIONS

| | | | |
|---|---|---|---|
| 1,106,384 | 7/1955 | France | 55/396 |
| 555,908 | 9/1943 | Great Britain | 55/457 |

*Primary Examiner*—Bernard Nozick
*Attorney, Agent, or Firm*—Lyon & Lyon

[57] ABSTRACT

A liquid-gas separator particularly useful for removing liquid from the high velocity intake air of a truck engine and readily adaptable for mounting within a restricted space, such as the engine compartment, provides a high efficiency liquid-gas separation without an excessive pressure drop. The separator includes at least one separator element or chamber where liquid is inertially separated from a spinning stream of gas flowing therethrough onto the inner surface of the chamber. The separated liquid is bled from the chamber by a portion of the gas stream which after depositing the removed liquid is caused to return to the main stream of gas.

20 Claims, 11 Drawing Figures

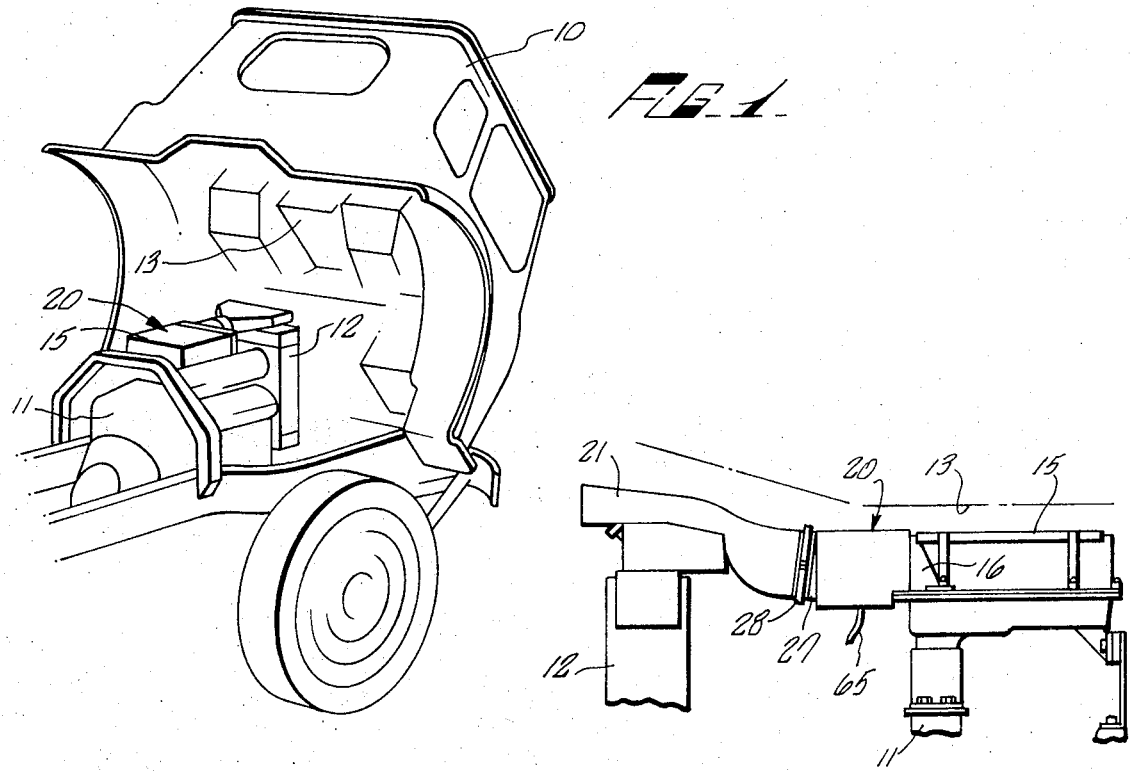
FIG. 1
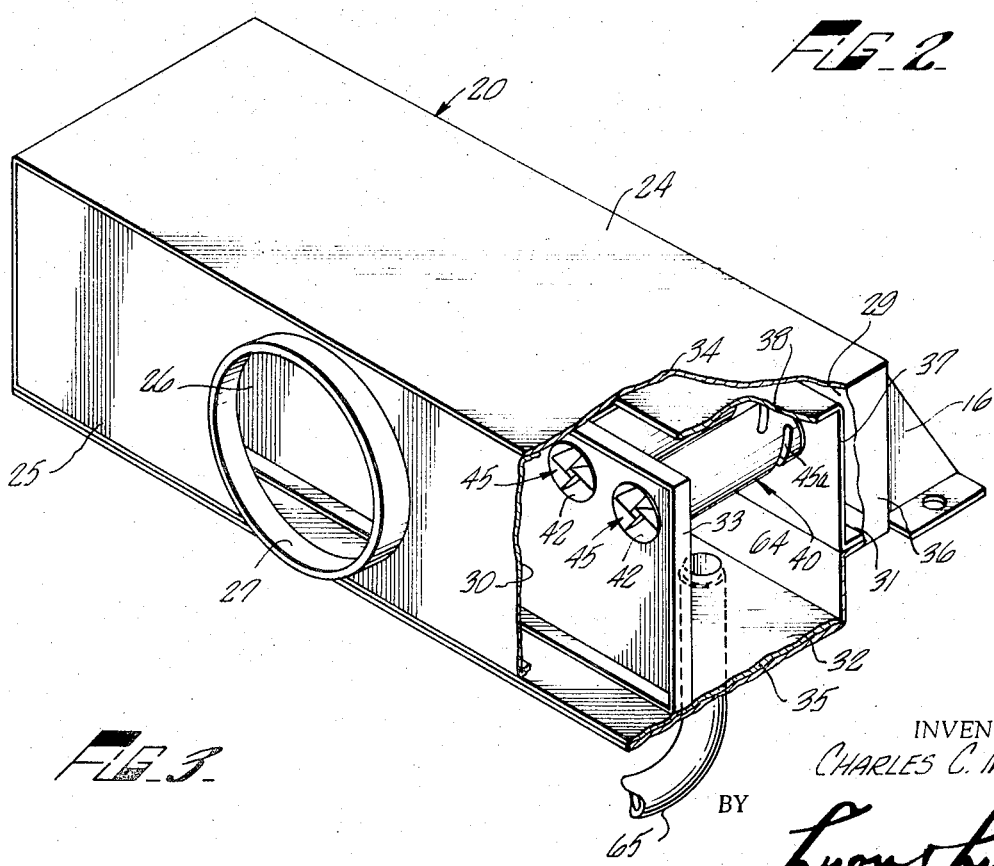
FIG. 2
FIG. 3
INVENTOR.
CHARLES C. MUGFORD
BY
Lyon & Lyon
ATTORNEYS.

INVENTOR.
CHARLES C. MUGFORD
BY
Lyon & Lyon
ATTORNEYS.

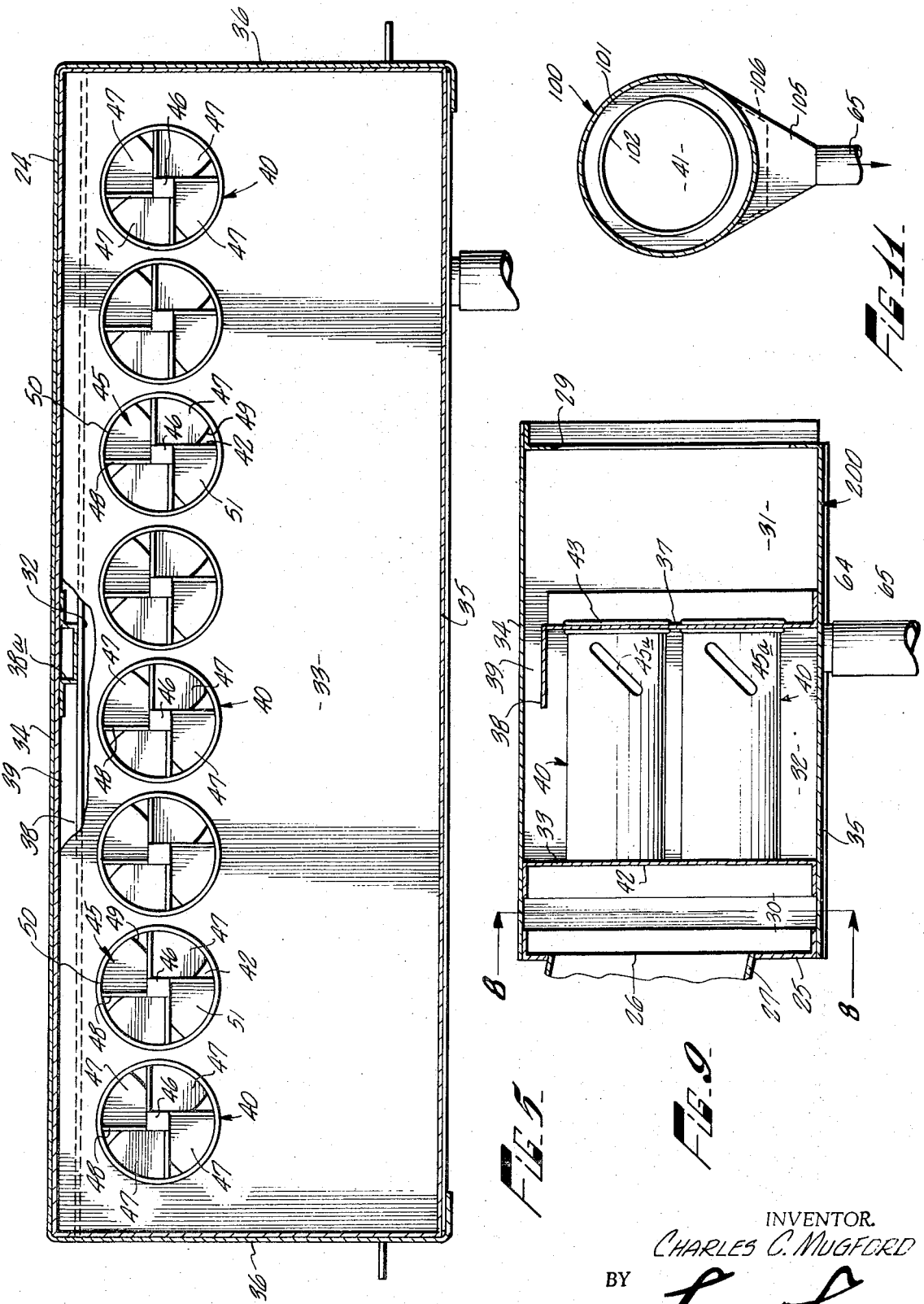

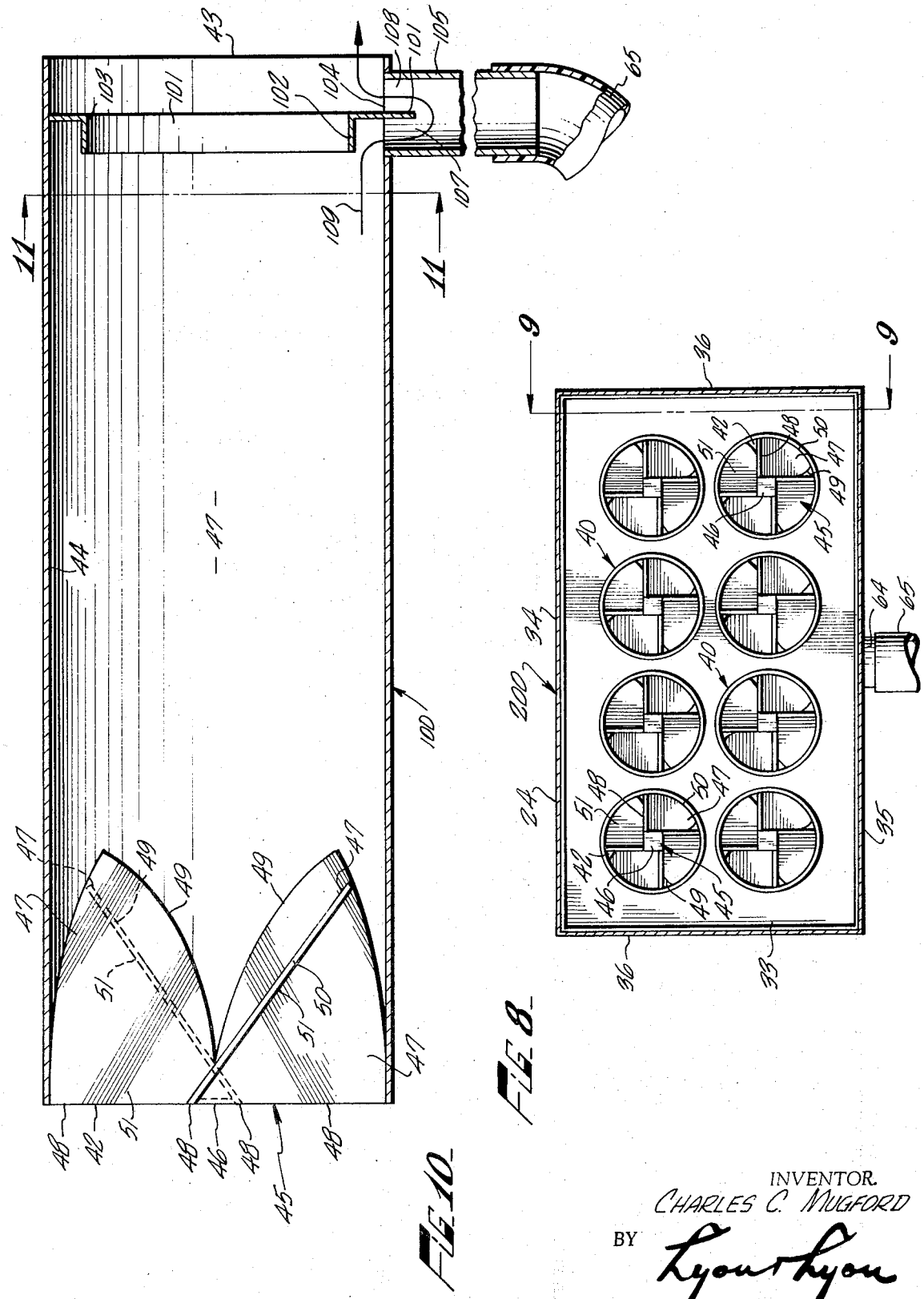

LIQUID-GAS SEPARATOR

This invention relates to a device for separating and removing liquid from a high velocity stream of air or other gas and more specifically relates to an inertial type liquid-gas separator which is particularly useful for removing liquid from the intake air of a truck engine.

There are numerous situations where it is desirable or necessary to remove moisture droplets and other forms of liquid that are entrained in a high velocity stream of gas conducted to or from a system for handling the gas due to the adverse effects such liquid may have on various components or operations in the system or the ultimate intended use of the gas. An example of such a situation involves air filters employing dry type filter media which is adversely affected and prematurely clogged if a substantial quantity or concentration of liquid is present in the air supplied to such filter. One such air filter of this type and one for which the present invention has been found to be particularly suitable, although not in any way limited to, is shown and described in my currently pending United States patent application, Ser. No. 120,079 entitled, "AIR FILTER ASSEMBLY" and my currently pending U.S. Pat. application Ser. No. 227,442 entitled, AIR FILTER ASSEMBLY, which is a continuation-in-part of my application, Ser. No. 120,079.

Certain conventional devices for removing liquid from a gas stream employ a mat of geometrically or randomly arranged fibers through which the gas stream is passed. The droplets of liquid impinge and collect on the fibers and are thereby extracted from the gas passing through the mat. However, as the separated liquid migrates downwardly on the fibers to drain, it is exposed to the gas stream, and there is a tendency for some of the liquid to be discharged from the mat and again become entrained in the flowing gas stream. This inherent characteristic of having the liquid become re-entrained in the gas stream is even more critical at relatively high velocities. Moreover, the very nature of this mat separator is apt to create an undesirable large pressure drop in the gas flowing therethrough.

Certain other conventional liquid-gas separator devices involve a sharp change in the direction of the gas stream between the inlet and outlet of the separator caused by a turning elbow or other means. The abrupt change in direction of the flowing gas stream causes the liquid entrained in the gas to separate therefrom and impinge on the deflecting surface. It is common in this type device for the separated liquid to collect and drain downwardly on the deflecting surface to the bottom where it is removed. However, as with the fibrous mat type device, the draining liquid is exposed to the flowing gas stream, and this gas stream causes some of the liquid to move across the surface to a downstream edge where it is discharged before it reaches the bottom of the surface and thus becomes re-entrained in the gas stream. In order to minimize the quantity of liquid which becomes re-entrained in the gas stream, it is desirable to use a portion of the gas stream to rapidly carry or bleed the separated liquid away from exposure to the main stream of gas flow. In this regard it should be noted that the kinetic energy of this bleed gas used to remove the separated liquid avoids the use of another independent source, such as a blower, to accomplish this purpose. However, it is also desirable to avoid a reduction in the output of gas flowing from the device. Therefore, it is an important object of this invention to provide a liquid-gas inertial separator which removes the separated liquid from exposure to the main gas stream to minimize re-entrainment of the liquid in the gas stream without substantially reducing the output of gas flow.

Moreover, in certain particular systems the size and shape of the space available for a liquid-gas separator device may be restricted and, thus, the use in such a system of a device having a particular geometry because of the need for a sharp directional change of the gas stream between the inlet and outlet of the separator may be substantially limited or completely prohibited. One such system involving space restrictions relates to the supply of air to the air intake of a truck engine. For reasons set forth in my above-mentioned co-pending U.S. Pat. application Ser. No. 120,079 it is desirable to mount the air filter assembly directly on the engine and within the engine compartment, supply the air to the engine through a relatively unrestricted path directly from the front of the vehicle, and minimize the path of travel necessary to conduct the incoming air to the air filter. In accordance with these conditions, it is preferable that the liquid-gas separator also be mounted within the engine compartment and substantially "in-line" with the direct flow path of air between the air inlet at the front of the truck vehicle and the air filter assembly. However, as stated before, the space available in the engine compartment is restricted and, in addition, the shape of the space available may vary according to the type of truck vehicle involved. Therefore, it is another important object of this invention to provide an inertial, in-line type air liquid separator which is particularly adapted for use in a system for supplying air to a truck engine and which because of the nature of its operation is easily modified for mounting in any convenient location within the engine compartment of various type truck vehicles.

In brief summary the present invention includes one or more separator elements or chambers, each having a straight passageway through which the gas flows and in which the liquid and gas are separated. A stationary spinner at the inlet end of the passageway includes a plurality of blades adapted to impart a whirling or spinning motion to the gas passing therethrough and thereby induce inertial separation of liquid entrained within the gas. The present invention includes a novel form of spinner which is particularly adapted to handle liquid entrained in the center portion of the gas stream. This portion of the gas stream normally has a tendency to by-pass the deflecting surfaces of the blades and continue on through the passageway without spinning which in turn reduces the separation efficiency of the device. The separated liquid in each element collects on the inner surface of the passageway and is then caused to travel along the surface by the whirling gas flow toward the outlet end of the passageway. Liquid removal means including at least one bleed slot interrupt the travel path of the separated liquid and this liquid is then induced to exit from the passageway out through the slot by a portion of the gas stream, which, after depositing the removed liquid, is caused to return to the main gas stream. Accordingly, it is still another important object of this invention to provide a liquid-gas separator of the type described which is highly efficient and produces only a minimal pressure drop.

Other and more detailed objects and advantages of this invention will appear from the following description and the accompanying drawings.

In the drawings:

FIG. 1 is a perspective view of the engine compartment of a large truck of the "cab-over" type illustrating the mounting and location of the liquid-gas separator in a particular truck engine air supply system.

FIG. 2 is a side view illustrating the position of the separator between the air filter and the air inlet at the front of the vehicle with phantom lines indicating the approximate position of the lower portion of the cab forming the top of the engine compartment.

FIG. 3 is a perspective view of the housing of the separator partially cut away to illustrate the arrangement of the various components of the separator.

FIG. 5 is a front sectional view of the housing taken substantially on the lines 5—5 of FIG. 4 and illustrating the inlet ends of a plurality of separator chambers.

FIG. 8 is a front view similar to FIG. 5 taken substantially along the lines 8—8 of FIG. 9 and illustrating a modified form of the invention.

FIG. 9 is a side sectional view taken substantially along the lines 9—9 of FIG. 8.

FIG. 10 is a side sectional view illustrating still another modified form of the liquid-gas separator device of this invention.

FIG. 11 is a front view taken substantially along the lines 11—11 of FIG. 10.

Figure 4:
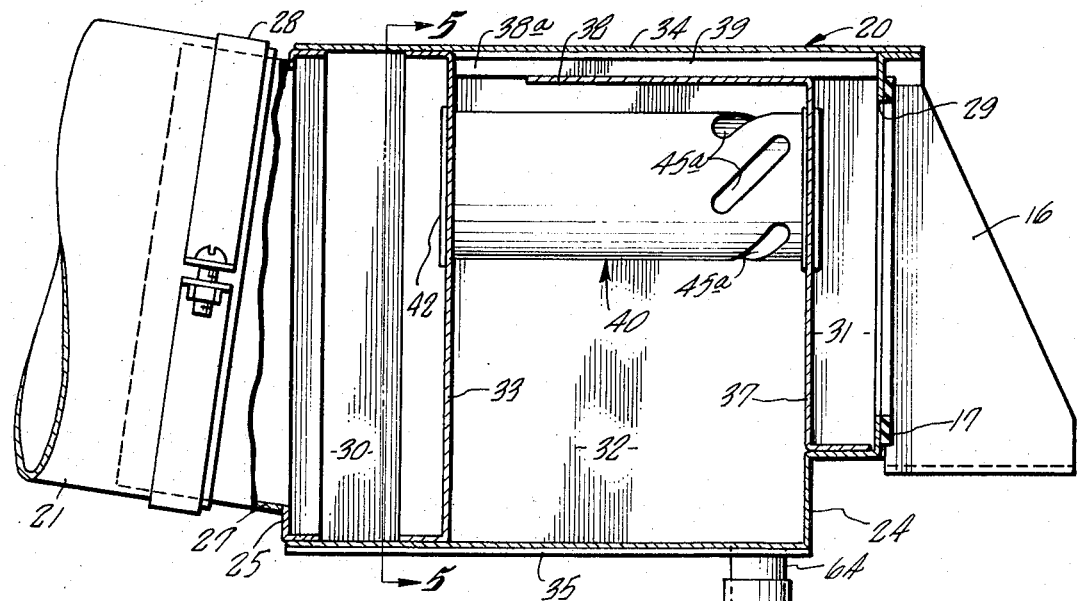
FIG. 4 is a side sectional view of the housing further illustrating the arrangement of the various components of the separator.
Figure 6:
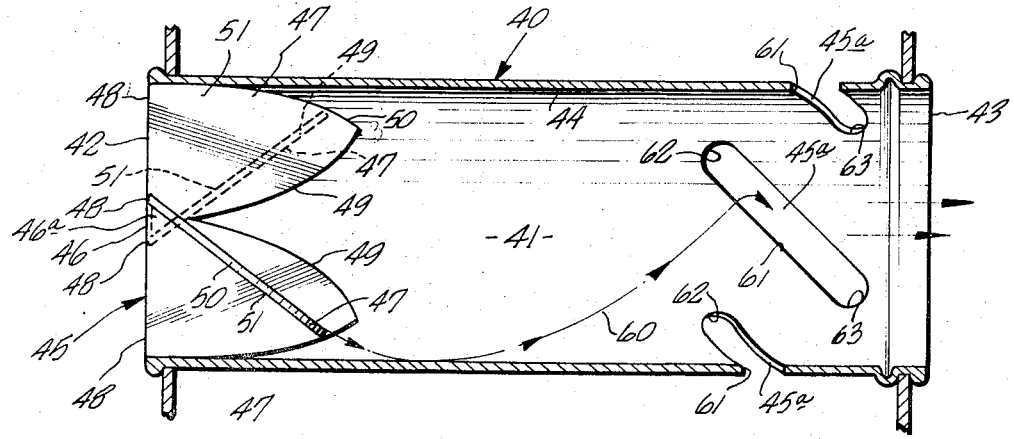
FIG. 6 is a side sectional view of one of the separator elements or chambers illustrating the travel of the separated liquid along the inner surface of the chamber.

It should be noted that FIGS. 1 through 6 of the drawings illustrate a particular form of the liquid-gas separator of this invention specifically adapted for use in the air supply system of one model of truck. However, an important feature of this invention is that by appropriate modifications the separator device of this invention can be used in other arrangements and other systems with equally advantageous results.

Referring now more particularly to FIG. 1, the truck is illustrated with the cab 10 in the raised position to expose the engine 11 from the rear. The radiator 12 is positioned immediately in front of the engine. When the cab 10 is lowered into operating position the underside of the cab as viewed in FIGS. 1 and 2 forms the engine compartment and surrounds the engine relatively closely. Part of the engine compartment includes the central engine tunnel portion 13 which in the interior of the cab 10 comprises a substantially raised portion between the driver and passenger positions of the cab. This engine tunnel portion 13 is conventionally sized by the truck manufacturer to provide a minimum clearance between the engine and such portion whereby the engine tunnel portion 13 presents a minimum of obstruction within the cab 10. It is this minimal space between the walls of the engine compartment including the engine tunnel portion 13 that restricts the size and shape of a liquid-gas separator installed within the engine compartment.

Referring to both FIGS. 1 and 2, the preferred form of the liquid-gas separator of this invention is generally designated 20. The minimal space between the engine 11 and the engine tunnel 13 is diagrammatically shown in FIG. 2 and it is within this space that the compact liquid-gas separator 20 is mounted. An air intake duct or scoop 21 extends from an air inlet (not shown) at the front of the cab 10. The intake end 23 of the scoop 21 is preferably positioned above the radiator 12 to permit intake of the air without it being heated by the radiator 12 and engine 11 prior to introduction to the air filter. Moreover, the provision of this substantially unrestricted air intake at the front of the vehicle along with the direct straight through flow of the air produces an advantageous air ram effect which forces air at a relatively high velocity into the engine when the truck is in motion.

Referring now more particularly to FIGS. 3-7, the embodiment of the invention shown includes a generally rectangular housing 24 of any convenient material such as sheet metal. The front end wall 25 of the housing is provided with an air inlet opening 26 surrounded by an annular flange 27. The air inlet 26 is connected to the downstream end of the duct 21 through a clamp and coupling arrangement 28 which is secured to the flange 27. The rear end of the housing includes an outlet opening 29 which extends laterally substantially across the entire housing 24. This outlet opening 29 is preferably adapted to be connected to the cartridge 15 of the air filter assembly illustrated, described and claimed in my above mentioned co-pending U.S. Pat. application, Serial No. 120,079 and my above mentioned copending U.S. Pat. application, Ser. No. 227,442. Mounting brackets 16 extending from each side of the outlet 29 are adapted to secure the separator 20 to the filter assembly and align the outlet 29 of the separator with the air inlet (not shown) of the filter cartridge 15. An annular seal 17 around the outlet 29 is adapted to abut the filter cartridge and prevent leakage therebetween. However, it should be made clear that the liquid-gas separator of this invention could be readily adapted for use with almost any type air filter assembly or adapted for use in other type systems such as those involving the supply of gas for turbines, compressors, and other chemical and physical processes which may or may not include an air filter assembly.

Within the housing 24 is an air inlet plenum 30 immediately adjacent the air inlet 26, an air outlet plenum 31 adjacent the outlet opening 29, and a liquid collection chamber 32 between the air inlet and outlet plenums 30 and 31. An interior wall 33 extending vertically between the top 34 and bottom 35 of the housing and extending horizontally between the sidewalls 36 of the housing 24 separates the inlet plenum 30 and liquid collection chamber 32. An interior panel 37 extending horizontally between the sidewalls 36 and extending vertically upward from the bottom of the outlet plenum 31 to just below the top 34 separates the outlet plenum 31 and the liquid collection chamber 32. The upper end of the interior panel 37 is provided with a flange 38 which also extends between the sidewalls 36 and substantially across the liquid collection chamber 32 adjacent the top 34 toward the interior wall 33. A brace member 38a, seen best in FIGS. 4 and 5, secured to both the underside surface of the top 34 and the flange 38 and extending from the interior wall 33 to the rear of the housing, provides support for the flange. The flange 38 and the underside surface of the top 34 thus form a passageway 39 at the top of the housing extending between the liquid collection chamber 32 and the outlet plenum 31.

The required liquid and gas separation efficiency without excessive pressure drop through the separator unit 20 is in this embodiment achieved by a plurality of ten tubular separator elements or chambers, generally designated 40. However, as will be made apparent from the following discussion, the number of elements or chambers may vary and in certain instances, the desired liquid and gas separation might be achieved by a single tubular separator element or chamber. Each element or chamber 40 extends across the liquid collection chamber 32 between and through the interior wall 33 and panel 37, and defines a straight tubular passageway 41 through which the gas, air in this particular instance, flows. The passageway 41 includes an open inlet end 42 in communication with the air inlet plenum 30, an open outlet end 43 in communication with the air outlet plenum 31, and a smooth cylindrical inner surface 44. Immediately adjacent the inlet end 42 of each separator element 40 is a stationary gas spinner, generally designated 45, which is adapted to impart a whirling motion to the incoming liquid laden gas passing therethrough and thereby induce an inertial separation of the liquid which after being separated impinges on the inner surface 44. Adjacent the other outlet end 43 of each separator element is the means for removing the separated liquid from the passageway and away from exposure to the main stream of gas flow. In this particular embodiment of the invention the removal means comprises a plurality of bleed slots 45a which are adapted to provide communication for the separated liquid into the liquid collection chamber 32.

The spinner 45 is an integral member having a center section or baffle 46 with a plurality of four blades 47 extending therefrom. Each blade 47 includes an upstream leading edge 48 extending from the center portion 46 of the spinner across the inlet opening 42 to the inner surface 44 of the passageway 41 and positioned at right angles to the leading edge of each adjacent blade 48, a convex back edge 49 extending from the center section 46 rearwardly in the passageway 41 to the inner surface 44, and a third outside edge 50 which extends along the inner surface 44 from the leading edge 48 to the back edge 49. The edges 48, 49 and 50 of each blade define a flat radially diverging deflecting surface 51 which is angularly disposed with respect to the direction of the incoming gas stream and which provides the turning moment necessary to whirl or spin the gas in the passageway 41.

Figure 7:
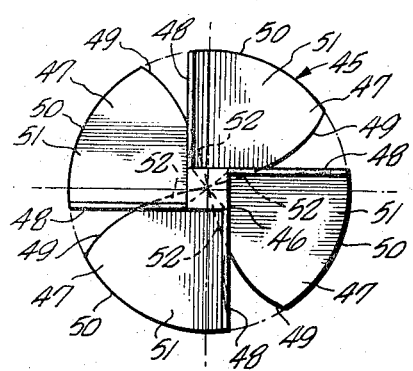
FIG. 7 is a front view illustrating the novel form of the stationary gas spinner of this invention which is located adjacent the inlet end of each separator element.

It should be noted that the intersection of the leading edge 48 and the back edge 49 of each blade 47, as viewed from the front of the opening 42, is off-set from the exact center or gas spinning axis of the passageway 41 or of the circle as defined by the cylindrical inner surface 44 and, as indicated by the phantom lines 52 of FIG. 7, occurs in the opposite half of the circle with respect to its outside edge 50. Also, the back edges 49 of all the blades 47 first converge before diverging and the baffle or center section 46 covers this pocket or space 46a formed between the front of the spinner 45 and the converging portion of the back edges 49. Again as viewed from the front of the opening 42 and with respect to the direction of the incoming gas stream, the leading edge 48 of each blade 47 crosses over the back edge 49 of the deflecting surface 51 of a next adjacent blade 47 and, thus, the deflecting surfaces 51 overlap in the center of the passageway. In this manner when the gas in the center portion of the gas stream flows around the leading edges 48 or baffle 46 it is intercepted by sufficient area of deflecting surface to prevent its by-pass and flow through the passageway without spinning. This failure to spin would in turn result in liquid in this portion of the gas remaining entrained therein and passing through the separator.

The spinner 45 whirls or spins the gas through the passageway 41 in a double spiral helix and the helix angle is primarily dependent on the angular position of the deflecting surface of the blades 47 with respect to the direction of the incoming gas flow. That is, a decrease in the angle of each deflecting surface 51 with respect to the direction of gas flow will result in a decrease in the helix angle and vice versa. Generally speaking, the smaller the helix angle, the greater is the efficiency of the separation of the liquid from the gas. On the other hand, too small an angle between the deflecting surfaces 51 and the direction of gas flow will result in an excessive pressure drop. Therefore, while it is not intended to be a critical limitation of this invention, it is generally preferable to position the deflecting surfaces 51 of the blades at approximately a 143° angle with respect to the direction of the incoming gas flow or at approximately a 53° angle with respect to the plane of the inlet 42 in order to provide the desired degree of liquid-gas separation while at the same time avoiding an excessive pressure drop.

In operation, air or other gas enters the inlet 26 at a relatively high velocity and is distributed in the inlet plenum 30 and passes into the separator elements 40. The spinner 45 then whirls or spins the gas in the tubular passageway 41 whereby centrifugal force acting on the liquid mass causes the liquid to deviate from the gas flow stream and impinge on the inner surface 44 of the passageway. It is preferable to spin the gas at least about one and a half times within the passageway to create an adequate separation of the liquid and gas. Therefore, the inner surface 44 of the tubular passageway 41 between the spinner 45 and the bleed slots 45a should be long enough to accomodate the desired number of spins of the gas and also long enough to catch the separated liquid. This length varies according to the diameter of the passageway 41 or inlet 42 and the angular position of the blades 47 with respect to the direction of the incoming gas flow. However, it has been determined that if the length of the passageway between the mid-point of the spinner 45 and the beginning of the upstream ends of the bleed slots 45a is approximately 1.75 times the internal diameter of the passageway, the desired results will be obtained. It should be noted that this distance is measured from the mid-point of the spinner 45 in order to compensate for any change in the angular position of the blades 47. This compensating factor occurs because any change in the angular position of the blades affecting a necessary adjustment of the length of the passageway automatically results in corresponding change of the axial extension or length of the spinner 45 in the passageway.

Another important feature of this invention relates to removal of the separated liquid from the interior of the separator element 40 or passageway 41 and away from exposure to the main stream of gas flow to prevent reentrainment of the liquid. In the separator device 20 of the present invention, after the separated liquid has impinged on the inner surface 44, it is moved along this surface by the whirling gas flow passing adjacent thereto in a particular helical course of travel toward the downstream end of the passageway 41, as indicated by the directional arrows 60. In the preferred embodiment of the invention, the separated liquid travel is intercepted by the plurality of elongated bleed slots 45a. The slots are in communication with collection chamber 32 and located around the circumference of the passageway 41 upstream of the outlet 43. It has been found that the direction of liquid travel in this portion of the passageway 41 is approximately 45° with respect to the circumference of the passageway. Therefore, in order to prevent a by-pass of the slots by a flow of some of the liquid tangentially along the upstream lengthwise edges 61 of the slots and then around the ends of the slots 45a to the outlet 43, the lengthwise edges of the slots are also oriented at a 45° angle with respect to the circumference of the passageway, but preferably perpendicular to the direction of the liquid travel. It should also be noted that the upstream end 62 of each bleed slot 45a overlaps the downstream end 63 of the next adjacent slot with respect to the direction of the travel path of liquid to prevent a by-pass of the liquid around the ends of the slots 45a. In this manner the slots 45a present a continuous trap for the separated liquid around the circumference of the passageway 41 with respect to the direction of the liquid travel.

Once the separated liquid reaches the bleed slots 45a, it is induced to pass out through the slots into the liquid collection chamber 32 by a portion of the gas which deviates from the main gas stream in the passageway. However, another important feature of this invention is the return of this bleed gas after it has rid itself of the liquid to the other major portion of gas which proceeds directly through the passageway 41 and out the outlet end 43. After the liquid has been bled from the interior of the element 40 or the passageway 41 through the slots 45a, gravity induces separation of this liquid from the bleed gas. The liquid then drains downwardly into the collection chamber 32 which is preferably large to prevent a pull up of the collected liquid by a sudden pressure surge back into the interior of the elements 40. The bleed gas flows upwardly along a rather tortious path through the passageway 39 at the top of the housing and on into the outlet plenum 31. It should be noted that the outlet plenum 31 has a relatively low pressure as compared to the collection chamber 32 and this induces a flow of the bleed gas from the collection chamber. The bleed gas then mixes in the outlet plenum 31 with the other gas flowing from the outlet 43 of each separator element 40.

The liquid collected in the collection chamber 32 migrates into a drain spout 64 at the bottom of the collection chamber 32 and then passes on into a drain hose 65. The drain hose 65 is sufficiently long to conduct the liquid to a desired discharge location where the liquid will no longer interfere with the system. The drain hose 65 is provided with an orifice 66 at its lower end which permits the flow of liquid therethrough, but restricts the flow of gas into the hose and on into the collection chamber. The spout 64 and hose 65 are also sufficiently long to permit a build up of liquid whereby the pressure in the hose (measured by the liquid head) will exceed the pressure outside the hose at the orifice 66. Upon the accumulation of enough liquid in the hose to exceed the pressure surrounding the lower end of the hose, the liquid head in the hose 65 wwll cause the liquid to drain through the orifice 66. In this manner the separated liquid is discharged from the separator 20 without the necessity of any pumps, valves or the like which might be susceptible to clogging. It has been found that when the separator is used to separate water from the truck engine air supply of the system described above that an orifice 66 approximately five-sixteenth inch in diameter is preferable to provide sufficient drainage without allowing air from the outside to be sucked in.

The other two embodiments of the invention shown in FIGS. 8 and 9 and FIGS. 10 and 11, respectively, illustrate the flexibility of this invention. The nature of the operation of the liquid-gas separator of this invention is such that, given a required volume of gas flow, the separator may be readily designed to meet various different space restrictions. For example, a particular volume of air flow requires a certain total cross-sectional area of passageway through the separator and, as pointed out above, this area or the diameter of the area in turn determines the preferred overall length of passageway. Therefore, where the space restriction amounts to a limitation on the length of the space available for mounting the separator in a system, as is the case in the particular truck engine air supply system discussed above, a plurality of relatively short tubular separator elements 40 are used in the manner of the preferred embodiment. The exact number of elements 40 depends on the volume of gas flow and, thus, the total cross-sectional area of passageway needed to handle this flow.

On the other hand, if the length of the available space is relatively unrestricted, it may be desirable to use only a single tubular separator element or chamber 40 to handle this same volume of gas flow. The embodiment of the invention with only a single chamber is shown in FIGS. 10 and 11 and is generally designated 100. This embodiment of the invention, aside from its particular shape, has the advantage of being relatively less complex in construction and creates a minimum pressure drop per cross-sectional flow area. Several of the components of this embodiment of the separator are identical to these components of the above described preferred embodiment, including the air spinner 45 and the tubular passageway 41, and, therefore, in order to avoid a repeat of the above discussion, these same components will be designated by the same reference numerals and will not be described in detail.

Referring now in detail to FIGS. 10 and 11, it should be noted that this embodiment is a self-contained unit and does not require the housing of the preferred embodiment. Instead, the inlet end 42 of the passageway 41 is adapted to be connected directly to a gas supply conduit (not shown) or, if this embodiment is used in the air supply system for a truck engine, to the air supply duct 21 with the outlet end 43 adapted to be connected to the air filter assembly.

The incoming air or other gas passing through the spinner 45 is spun or whirled in an identical manner as before and the water or other liquid is thereby induced to separate from the gas by centrifugal force. The separated liquid impinges on the inner surfaces 44 of the passageway 41, as before, and also in the same manner as before is moved along the surface 44 toward the outlet end 43 by the whirling gas flow passing adjacent thereto. However, instead of a plurality of bleed slots 45a interrupting the travel path of the liquid, an annular trough or trap 101 is provided. The trough 101 is positioned adjacent the outlet end 43 and extends radially inward from the surface 44, with a cylindrical flange 102 at its inner edge 103 extending axially toward the upstream end of the passageway 41. A slot opening 104 at the bottom of the chamber extends circumferentially around a bottom portion of the trough 101 and provides communication between the passageway 41 and a downwardly extending drain spout 105, which is connected to a drain hose 65. The trough 101 extends partially down into the drain spout 105 as indicated by the phantom line 106 in FIG. 11 and thereby defines an inlet passage 107 into the drain spout 105 on the upstream side of the trough 101 and a bleed gas return passage 108 on the downstream side of the trough 101.

Thus, in operation the separated liquid travels along the surface 44 until it is interrupted by the trough 101. The liquid is then carried through the opening 104, as before, by a portion of bleed gas which deviates from the main stream of gas. After this bleed gas carries the liquid through the slot 104 into the drain spout 105, the liquid separates from this gas under the influence of gravity. This bleed gas then returns to the main stream of gas flow through the return passage 108, as indicated by the directional arrow 109 in FIG. 10. In this regard, it should be noted that a low pressure zone relative to the pressure in the drain spout 105 is created at the downstream side of the trough 101 adjacent the outlet of the return passage 108, and this low pressure induces a return of the bleed gas from the drain spout 105 to the other major portion gas in the passageway 41. The liquid removed from the interior of the chamber 40 and away from exposure to the gas flow stream is then drained out through the drain hose 65 in the manner described above.

In the other alternative embodiment of the invention, shown in FIGS. 8 and generally designated 200, there is provided a plurality of separator elements 40 arranged in a stacked relationship. This arrangement will also handle the same volume Of gas flow as the other embodiments and is advantagous where the available space for mounting the separator 20 is limited in both length and width. In all other respects, except for a relatively smaller collection chamber 31, this embodiment is substantially identical to the preferred embodiment. Therefore, a description of the separator 200 will not be repeated.

This invention provides a highly efficient liquid-gas separator having one or more straight flow through separator chambers in which liquid is separated from a relatively hIgh velocity gas stream without an excessive pressure drop. Separation of the liquid from the gas is induced by whirling or spinning the gas in the chamber or chambers, and a novel form of spinner provides for a better separation efficiency. Re-entrainment of the separated liquid in the gas is avoided by an efficient removal of the separated liquid from the separator chamber or chambers and such removal is accomplished without affecting the volume of gas flow through the separator. In addition the nature of the separator of the present invention is such that it is particularly adapted for use in those systems having only a restricted space available for the location of a separator.

Having fully described my invention, it is to be understood that I do not wish to be limited to the details herein set forth, but my invention is of the full scope of the appended claims.

I claim:

1. A device for separating liquid from a high velocity stream of gas, comprising:

at least one straight tubular passageway through which the gas flows and in line with the gas stream having an inlet end, an outlet end and an axially extending inner surface therebetween;

a stationary gas spinner positioned across said passageway for imparting a spinning motion to gas flowing through said passageway whereby inertia induces the liquid to separate from the spinning gas and impinge on said inner surface;

said spinner having a plurality of gas deflecting surfaces; each said surface diverging radially from the center portion of said passageway to said inner surface and being angularly disposed with respect to the direction of the incoming gas stream, said deflecting surfaces having overlapped center portions to prevent the by-pass of gas therethrough without spinning and said spinner thereby effects an increased separation efficiency;

each said gas deflecting surface being defined by three edges, a leading edge extending substantially perpendicularly from a first point at the center portion of said passageway across to a second point at said inner surface, a continuous back edge extending from said first point at said leading edge at the center portion of said passageway downstream to a third point at said inner surface, and an outside edge extending along said inner surface and in contact therewith from said second point at said leading edge to said third point at the back edge whereby liquid impinging on said deflecting surfaces is induced tO travel across said deflecting surfaces to said inner surface of said passage-way; and, liquid removal means upstream of said outlet end intercepting the separated liquid which is induced to travel on said inner surface toward said outlet end by the spinning gas flow, said liquid removal means including trap means extending continuously around said inner surface; a liquid collection chamber in communication with said trap means extending below said passageway to a liquid collection chamber and away from exposure to the gas stream flowing through said passageway, and gas return means extending from said liquid collection chamber to said outlet whereby a portion of gas bleeds separated liquid at said trap means from said passageway whereupon gravity induces the liquid into said collection means and said low pressure zone induces the bleed gas through said gas return means back to the main stream of gas.

2. The device of claim 1, wherein said inner surface extends axially a sufficient distance to accomodate at least 1 ½ spins of the gas in said passageway and to catch the impinging separated liquid upstream of said liquid removal means.

3. The device of claim 1 wyerein the distance of said inner surface extending from the midpoint between the upstream and downstream ends of said spinner to said liquid removal means is about 1.75 times the diameter of said inner surface.

4. The device of claim 1, wherein said liquid collection chamber includes a drain hose for discharge of the collected separated liquid.

5. The device of claim 1, wherein said angularly disposed deflecting surfaces are adapted to spin the gas in a helical spiral and along a sufficiently sharp helix angle to efficiently separate the liquid from the gas without creating an excessive pressure drop.

6. The device of claim 5, wherein said deflecting surfaces are each angularly disposed 143° from the direction of the incoming gas stream.

7. A device for separating liquid from a high velocity stream of gas, comprising:

a plurality of separator elements through which the gas flows each having an inlet end, an outlet end and a straight tubular passageway therebetween in line with the gas stream;

gas spinning means in each said passageway adjacent said inlet end for spinning the gas passing therethrough in a helical spiral and thereby inducing inertial separation of the liquid from the spinning gas;

each said passageway having a smooth inner surface of sufficient length to accomodate the necessary spinning of the gas required for separation of the liquid and to catch the separated liquid which impinges thereon and which is thereafter induced by the spinning gas to travel on said inner surface toward said outlet end in a non-perpendicular direction with respect to the circumference of said inner surface; and each of said spinning means having a gas deflecting surface being defined by three edges, a leading edge extending substantially perpendicularly from a first point at the center portion of said passageway across to a second-point at said inner surface, a continuous back edge extending from said first point at said leading edge at the center portion of said passageway downstream to a third point at said inner surface, and an outside edge extending along said inner surface and in contact therewith from said second point at said leading edge to said third point at the back edge whereby liquid impinging on said deflecting surfaces is induced to travel across said deflecting surfaces to said inner surface of said passage-way; and, a plurality of spaced elongated slots positioned circumferentially around each said passageway upstream of said outlet end and forming a continuous bleed opening with respect to the travel of the separated liquid on said inner surface whereby separated liquid in each said passageway is bled from the passageway by a portion of the gas therein out through said bleed opening and away from exposure to the main stream of gas to prevent re-entrainment of the separated liquid.

8. The device of claim 7, wherein the upstream lengthwise edge of each said slot intercepts the liquid travel on said inner surface and is substantially perpendicular thereto.

9. The device of claim 8, wherein the upstream lengthwise edge of each said slot is positioned at 45° with respect to the circumference of said inner surface.

10. A device for separating water and other liquid matter from the high velocity air stream flowing into the air intake filter of the engine of a truck vehicle, comprising:

a relatively compact housing for mounting within the engine compartment between the truck engine air inlet and the air intake filter, said housing having an air inlet plenum for receiving and distributing air from the air inlet, an air outlet plenum for distributing the substantially water free air to the air intake filter, and a water collection chamber between said air inlet plenum and said air outlet plenum;

a plurality separator elements through which the air flows each having an air inlet end in communication with said inlet plenum, an air outlet end in communication with said air outlet plenum, and a straight tubular passageway therebetween substantially in line with the air stream and extending across the upper portiOn of said collection chamber;

a stationary air spinner in each said passageway for imparting a spinning motion to air flowing through each said passageway and thereby inducing inertial separation of the water from the spinning air;

each said spinner having a plurality of air deflecting surfaces, said surfaces diverging radially from the center portion of said passageway to said inner surface and being angularly disposed with respect to the direction of the incoming air;

each said air deflecting surface being defined by three edges, 2 leading edge extending substantially perpendicularly from a first point at the center portion of said passageway across to a second point at said inner surface, a continuous back edge extending from said first point at said leading edge at the center portion of said passageway downstream to a third point at said inner surface, and an outside edge extending along said inner surface and in contact therewith from said second point at said leading edge to said third point at the back edge whereby liquid impinging on said deflecting surfaces is induced to travel across said deflecting surfaces to said inner surface of said passageway; and, each said passageway having an inner surface of greater length than diameter to accomodate the necessary spinning of the air required for separation of the water which impinges on said inner surface and which is thereafter induced by the spinning air to travel on said inner surface to said air outlet end in a non-perpendicular direction with respect to the circumference of said inner surface;

means in each said passageway upstream of said outlet end for intercepting the traveling separated water therein and removing the separated water from each said passageway into water collection chamber and away from the main stream of air therein to prevent re-entrainment of the water; and, air return means in the upper portion of said housing extending from said water collection chamber to a relatively low pressure zone in said outlet plenum whereby water in the bleed air is induced to separate by gravity and collect in the bottom portion of said water collection chamber and the relatively water free bleed air is induced to return via said air return means to the main stream of air in said outlet plenum.

11. The device of claim 10, wherein the number of said separator elements are increased in order to provide a shorter housing for the same volume of air flow.

12. The device of claim 10, wherein said separator elements are arranged in a stacked relationship to provide a shorter and narrower housing for the same volume of air flow.

13. The device of claim 10, wherein said deflecting surfaces are each disposed at approximately at 143° angle with respect to the direction of the incoming air.

14. The device of claim 10, wherein said deflecting surfaces have overlapped center portions to prevent the by-pass of air therethrough without spinning.

15. The device of claim 10, wherein said water removal means includes a plurality of space elongated slots positioned circumferentially around each said passageway in communication with said water collection chamber and forming a continuous bleed opening with respect to the travel of the separated water on said inner surface whereby separated water in each said passageway is bled therefrom by a portion of the air therein out through said bleed opening into said water collection chamber.

16. The device of claim 15, wherein the upstream lengthwise edge of each said slot is perpendicular to the travel of the water intercepted thereby.

17. In a liquid gas separating device having a tubular passageway which includes an inner surface, an inlet adapted to receive a stream of liquid-gas mixture, a gas outlet, and a liquid outlet in the tubular passageway surface, wherein the improvement comprises;

a stationary spinner having a plurality of deflecting surfaces angularly disposed with respect to the direction of the incoming stream of liquid-gas mixture, said spinner positioned across the passageway upstream of the gas outlet and the liquid-gas mixture and thereby induce through inertia separation of liquid from the gas with the separated liquid impinging on the inner surface of the passageway;

each said gas deflecting surface being defined by three edges, a leading edge extending substantially perpendicularly from a first point at the center portion of said passageway across to a second point at said inner surface, a continuous back edge extending from said first point at said leading edge at the center portion of said passageway downstream to a third point at said inner surface, and an outside edge extending along said inner surface and in contact therewith from said second point at said leading edge to said third point at the back edge whereby liquid impinging on said deflecting surfaces is induced to travel across said deflecting surfaces to said inner surface of said passageway; and, said leading edge of each said deflecting surface extending laterally across the passageway more than half the lateral distance across the passageway and crossing over with respect to the incoming stream of liquid-gas mixture said back edge of a next adjacent said deflecting surface whereby by-pass of said spinner by the liquid-gas mixture in the center portion of the stream is avoided.

18. The device of claim 17, wherein each said deflecting surface is flat.

19. The device of claim 17, wherein said spinner is an integral component comprising at least three said deflecting surfaces.

20. The device of claim 19, wherein said spinner comprises four said deflecting surfaces.

* * * * *